United States Patent
Bleich et al.

(10) Patent No.: US 9,305,421 B2
(45) Date of Patent: Apr. 5, 2016

(54) INTELLIGENT POWER SUPPLY AND METHODS FOR MONITORING A POWER SUPPLY

(71) Applicant: WMS Gaming Inc., Waukegan, IL (US)

(72) Inventors: Charles R. Bleich, Cary, IL (US); Simon E. Sunblade, Chicago, IL (US)

(73) Assignee: Bally Gaming, Inc., Las Vegas, NV (US)

(*) Notice: Subject to any disclaimer, the term of this patent is extended or adjusted under 35 U.S.C. 154(b) by 445 days.

(21) Appl. No.: 13/790,658

(22) Filed: Mar. 8, 2013

(65) Prior Publication Data

US 2014/0256450 A1   Sep. 11, 2014

(51) Int. Cl.
*A63F 9/24* (2006.01)
*G07F 17/32* (2006.01)
*H02J 3/00* (2006.01)

(52) U.S. Cl.
CPC ............... *G07F 17/3202* (2013.01); *H02J 3/00* (2013.01)

(58) Field of Classification Search
CPC ......................... G07F 17/32; G07F 17/3202
See application file for complete search history.

(56) References Cited

U.S. PATENT DOCUMENTS

| | | | |
|---|---|---|---|
| 6,517,433 B2 | 2/2003 | Loose et al. | |
| 7,785,192 B2 | 8/2010 | Canterbury et al. | |
| 8,235,803 B2 | 8/2012 | Loose et al. | |
| 2005/0225173 A1* | 10/2005 | Woltereck | B60L 3/003 307/10.1 |
| 2008/0280664 A1 | 11/2008 | Canterbury et al. | |
| 2008/0294379 A1 | 11/2008 | Kim et al. | |
| 2009/0138133 A1* | 5/2009 | Buchholz et al. | 700/295 |
| 2009/0306914 A1* | 12/2009 | Cohen | 702/60 |
| 2010/0069160 A1 | 3/2010 | Barrett et al. | |
| 2010/0234099 A1 | 9/2010 | Rasmussen et al. | |
| 2010/0285866 A1* | 11/2010 | Bleich et al. | 463/24 |
| 2011/0053679 A1 | 3/2011 | Canterbury et al. | |
| 2013/0073232 A1* | 3/2013 | Billingsley et al. | 702/61 |

* cited by examiner

*Primary Examiner* — Jay Liddle
*Assistant Examiner* — Ryan Hsu
(74) *Attorney, Agent, or Firm* — Nixon Peabody LLP

(57) ABSTRACT

A method of monitoring a power supply of a gaming terminal comprises receiving, at an input of the power supply of the gaming terminal, an input power from an electrical power source, converting the input power to one or more output powers, providing, at one or more outputs of the power supply, the one or more output powers to one or more components of the gaming terminal, measuring, via one or more sensors, at least one electrical characteristic of the input power and the one or more output powers, and storing, in a memory, the measured at least one electrical characteristic for each of the input power and the one or more output powers.

18 Claims, 6 Drawing Sheets the one or more output powers to one or more components of the gaming terminal, measuring, via one or more sensors, at least one electrical characteristic of the input power and the one or more output powers, and storing, in a memory, the measured at least one electrical characteristic for each of the input power and the one or more output powers.

According to yet another aspect of the invention, computer readable storage media is encoded with instructions for directing a gaming system to perform the above methods.

According to another aspect of the invention, a gaming terminal comprises one or more input devices configured to receive player-inputs for playing a game, one or more display devices configured to display the game, a power supply, a plurality of sensors, one or more processors communicatively coupled to the plurality of sensors, and a memory communicatively coupled to the one or more processors. The power supply includes an input and a plurality of outputs. The power supply is configured to convert an input power received from an electrical power source at the input to a plurality of output powers provided at the plurality of outputs. The plurality of sensors are each communicatively coupled to a respective one of the input and the plurality of outputs. Each of the plurality of sensors is configured to measure at least one electrical characteristic of the input power and the plurality of output powers and generate a sensor signal indicative of the measured at least one electrical characteristic. The one or more processors are configured to process the sensor signals received from the plurality of sensors. The memory is configured to store data based on the measured at least one electrical characteristic indicated by the sensor signals. The data includes an indication of the measured at least one electrical characteristic and a time for each of the sensor signals generated by the plurality of sensors. The data is received from the one or more processors. At least one of the one or more processors is configured to analyze the data stored in the memory and generate a report based on the analysis. At least one of the one or more processors is configured to determine the occurrence of a power event based on the data and one or more power event criteria stored in the memory.

Additional aspects of the invention will be apparent to those of ordinary skill in the art in view of the detailed description of various embodiments, which is made with reference to the drawings, a brief description of which is provided below.

INTELLIGENT POWER SUPPLY AND METHODS FOR MONITORING A POWER SUPPLY

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to a power supply for a gaming apparatus and methods of monitoring a power supply.

BACKGROUND OF THE INVENTION

Gaming machines, such as slot machines, video poker machines and the like, have been a cornerstone of the gaming industry for several years. A gaming establishment may operate hundreds, thousands, or tens of thousands of gaming machines. Each of these gaming machines and their associated peripherals consume power and generate heat. Over time, the gaming machines and their associated peripherals require service to repair or replace old, broken, or malfunctioning components. As a result, operating costs associated with the power consumed, the heat generated, and the servicing of the gaming machines can be high.

SUMMARY OF THE INVENTION

According to one aspect of the present invention, a gaming terminal comprises one or more input devices configured to receive a wager from a player of the gaming terminal, one or more display devices configured to display a wagering game, and a power supply configured to power the one or more input devices and the one or more display devices. The power supply includes an input that receives an input power from an electrical power source, one or more outputs that provide one or more output powers, a power conversion module coupled to the input and the one or more outputs, one or more sensors communicatively coupled to the input and at least one of the one or more outputs, one or more processors communicatively coupled to the one or more sensors, and a memory communicatively coupled to the one or more processors. The power conversion module is configured to convert the input power received at the input to the one or more output powers provided at the one or more outputs. The one or more sensors are configured to measure at least one electrical characteristic of the input power and at least one of the one or more output powers. Each of the one or more sensors is further configured to generate a respective sensor signal indicative of the measured at least one electrical characteristic. The one or more processors are configured to determine log data based on the sensor signals. The log data includes an indication of each measured at least one electrical characteristic indicated by the sensor signals. The memory is configured to store the log data received from the one or more processors.

According to another aspect of the invention, a method of monitoring a power supply of a gaming terminal comprises receiving, at an input of the power supply of the gaming terminal, an input power from an electrical power source, converting the input power to one or more output powers, providing, at one or more outputs of the power supply, the one or more output powers to one or more components of the

Figure 1:
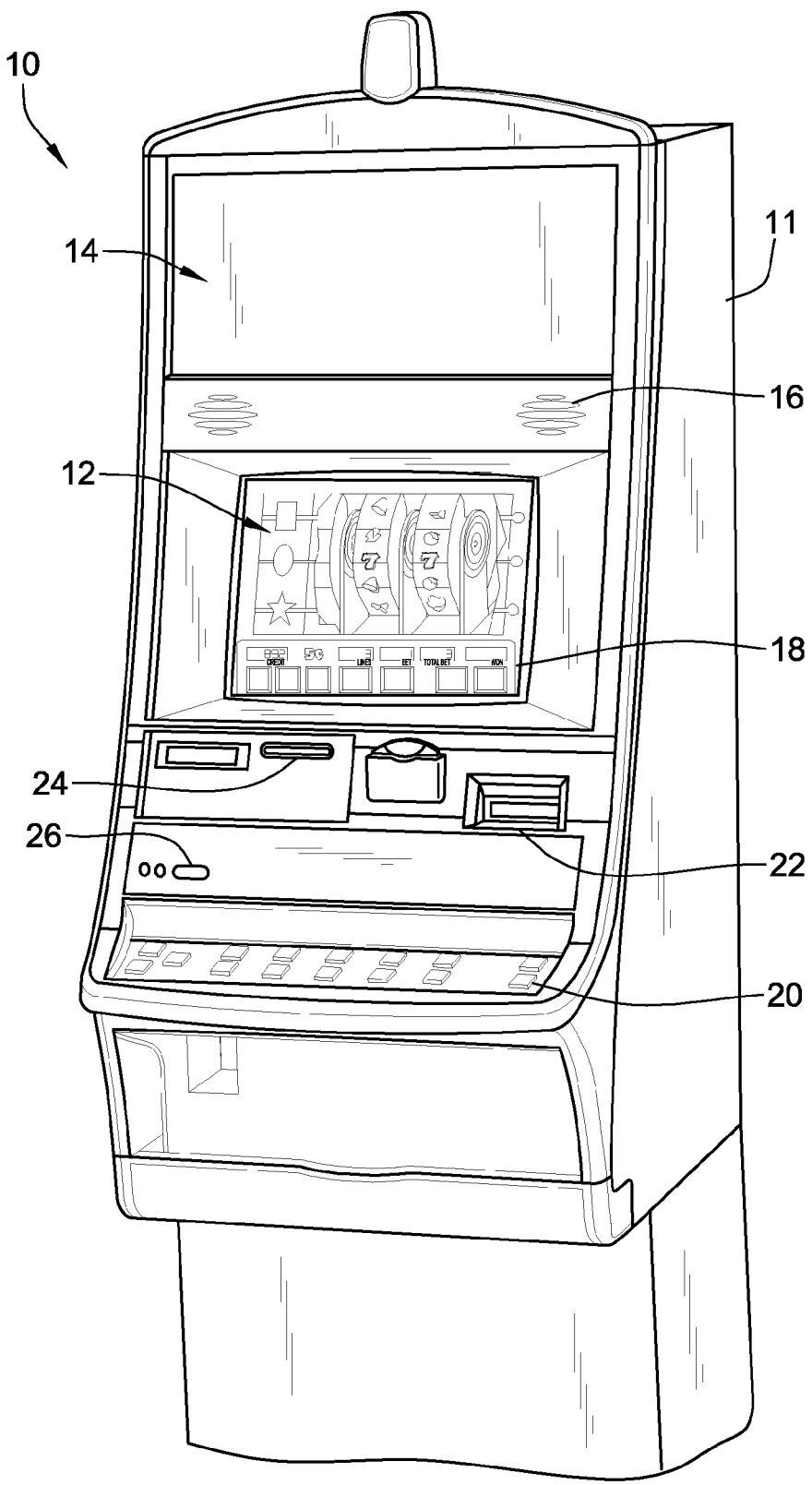
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, titled "Reel Spinning Slot Machine With Superimposed Video Image," U.S. Patent Application Publication Nos. US2010/0069160, titled "Handheld Wagering Game Machine And Docking Unit," and US2010/0234099, titled "Wagering Game System With Docking Stations" which are incorporated herein by reference in their entireties.

For purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
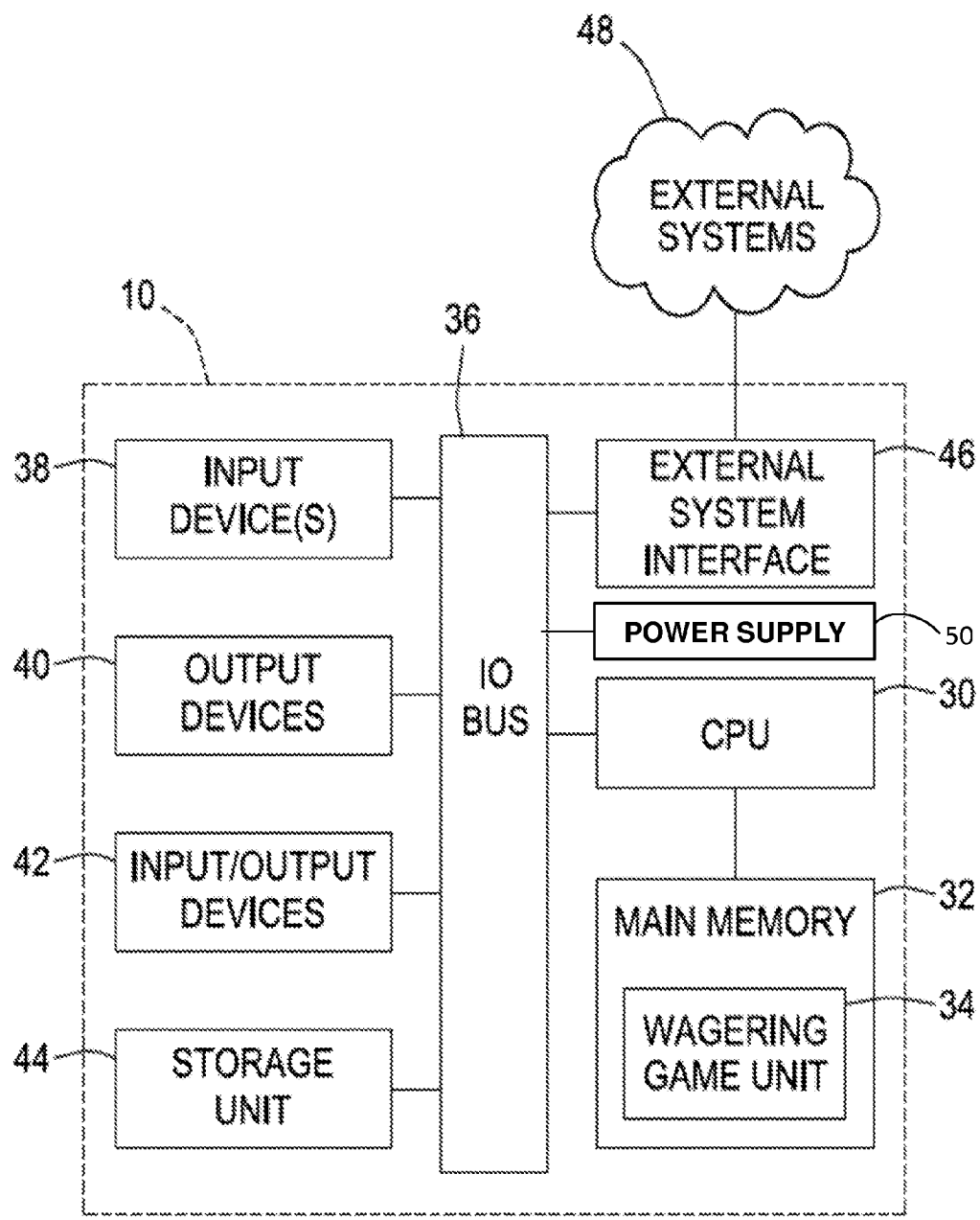
FIG. 2 is a schematic view of a gaming system according to an embodiment of the present invention.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44, external system interface 46, which is connected to external system(s) 48 (e.g., wagering game networks), and a power supply 50, which is configured to provide power to the components of the gaming terminal 10.

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., laptop, cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal). Additionally, as will be described in further detail below, the gaming terminal 10 can optionally communicate with the external system 48 to provide information relating to the power supply 50 and/or receive instructions for operating the power supply 50.

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
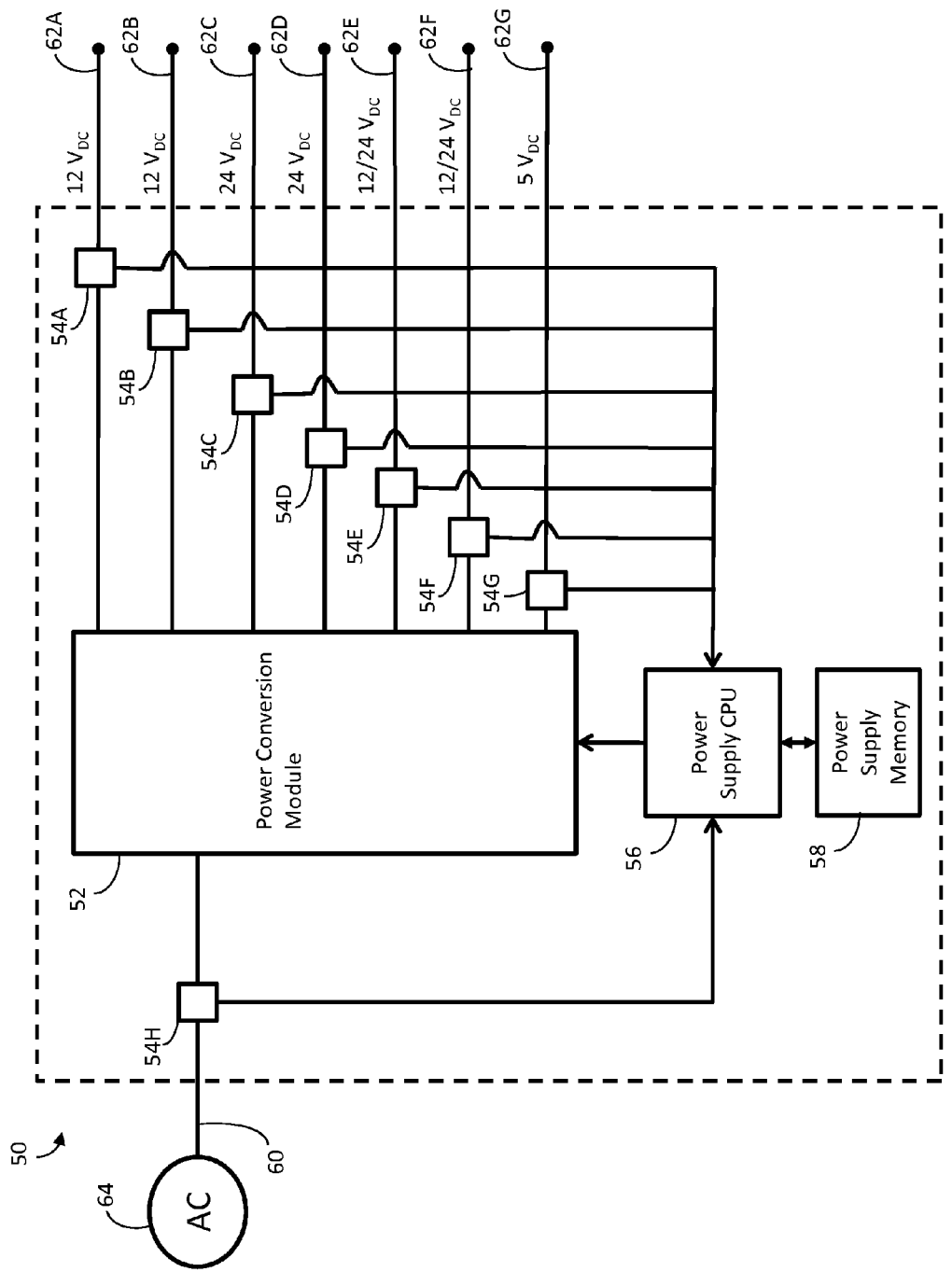
FIG. 3 is a block diagram of an exemplary power supply according to some aspects of the present disclosure.

Referring now to FIG. 3, a block diagram of an exemplary power supply 50 according to some aspects of the present disclosure is shown. In the exemplary embodiment illustrated in FIG. 3, the power supply 50 includes a power conversion module 52, a plurality of sensors 54A-54H, a power supply CPU 56, and a power supply memory 58.

The power conversion module 52 is configured to convert one or more input powers received at one or more inputs 60 of the power supply 50 to one or more output powers provided at one or more outputs 62A-62G of the power supply 50. The input power(s) can be received at the input(s) 60 from an external power source 64 such as, for example, an electrical power grid, a wall socket, a generator, etc. The output(s) 62A-62G of the power supply 50 are configured to provide the output power(s) to the components of the gaming terminal 10 (e.g., the input devices 38, the output devices 40, the input/output devices 42, the CPU 30, and/or the other components described above with respect to FIG. 1 and FIG. 2). The power conversion module 52 can include any suitable circuitry for converting the input power(s) to the output power(s) and/or implementing additional functionalities of the power conversion module 52 described below such as, for example, voltage regulator(s), current regulator(s), control circuit(s), trim circuit(s), switched output control(s), fault detection circuit(s), filter(s), transformer(s), and/or power factor correction circuit(s).

In the exemplary embodiment illustrated in FIG. 3, the power supply 50 includes an input 60, a first output 62A, a second output 62B, a third output 62C, a fourth output 62D, a fifth output 62E, a sixth output 62F, and a seventh output 62G. The input 60 is coupled to an alternative current (AC) power source 64 so as to receive an AC input power. The power conversion module 52 is configured to provide a 12 volt direct current (DC) output power (i.e., a 12 $V_{DC}$ output power) at the first output 62A and the second output 62B, a 24 $V_{DC}$ output power at the third output 62C and the fourth output 62D, an output power that is selectable as either a 12 $V_{DC}$ output power or a 24 $V_{DC}$ output power at the fifth output 62E and the sixth output 62F, and a 5 $V_{DC}$ output power at the seventh output 62G of the power supply 50. The components of the gaming terminal 10 can receive power from the outputs 62A-62G of the power supply 50 according to, for example, a distributed power regulation scheme. In some instances, the output power of the one or more of the outputs 62A-62G can be directly provided to a component of the gaming terminal 10. In other instances, a component of the gaming terminal 10 can receive power from one or more other components that directly receive an output power from the outputs 62A-62G. Additionally, the output power can be converted down for local use by a component of the gaming terminal 10 (e.g., the output power may be converted to a power having a voltage of 1.2 $V_{DC}$, 3.3 $V_{DC}$, 5 $V_{DC}$ and/or 15 $V_{DC}$). It should be understood that, according to additional and/or alternative aspects, the power supply 50 can include more than one input 60, a different number of outputs 62A-62G, different types of input powers and output powers (e.g., DC power and/or AC power), and/or different magnitudes of output power voltages than those illustrated and described with respect to FIG. 3.

According to some aspects of the present disclosure, the power supply 50 can be configured such that one or more of the outputs 62A-62G always provides a fixed output power when an input power is received at the input 60. That is, the power supply 50 can be configured such that one or more of the outputs 62A-62G is always activated when the input power is received at the input 60 of the power supply 50. For example, in the exemplary embodiment of FIG. 3, the power supply 50 can be configured such that the first output 62A always provides the 12 $V_{DC}$ output power and the third output 62C always provides the 24 $V_{DC}$ output power when the input power is received at the input 60 of the power supply 50.

According to additional and/or alternative aspects, the power supply 50 can be configured such that one or more of the outputs 62A-62G can selectively provide an output power or not provide an output power when the input power is received at the input 60. That is, the power supply 50 can be configured such that one or more of the outputs 62A-62G can be selectively activated and deactivated. For example, in the exemplary embodiment of FIG. 3, the power supply 50 is configured such that the second output 62B can be selectively activated and deactivated to provide the 12 $V_{DC}$ output power or no output power, respectively. Additionally, for example, in the exemplary embodiment of FIG. 3, the power supply 50 is configured such that the fourth output 62D can be selectively activated and deactivated to provide the 24 $V_{DC}$ output power or no output power, respectively.

The power supply CPU 56 is communicatively coupled to the power conversion module 52 and configured to provide control signals to activate and/or deactivate the outputs 62B, 62D. Controlling whether an output power is provided to a component of the gaming terminal 10 advantageously facilitates servicing of components of the gaming terminal 10 and can improve power consumption efficiencies. For example, removing the output power from an output 62B, 62D allows a peripheral component of the gaming terminal 10 (e.g., the primary display 12) to be removed or serviced without de-powering the CPU 30. This eliminates the need to re-boot the CPU 30, saving time in the replacement or servicing of the peripheral component.

Additionally, if a gaming terminal 10 is not being actively played, the power supply CPU 56 can provide a control signal to the power conversion module 52 to deactivate one or more components of the gaming terminal 10 so as to reduce the power consumed by the inactive gaming terminal 10. Thus, by deactivating an output providing power to the components of the gaming terminal 10, the components are actually powered down and not just in a "stand-by" mode. Fully powering down a component may be desirable because it can realize even greater reductions in power and heat generation compared to a "stand-by" mode. Additionally, it may serve to increase the lifetime and longevity of the particular component, resulting in additional efficiencies to those gained merely from energy savings.

According to further additional and/or alternative aspects, the power supply 50 can be configured such that one or more outputs 62A-62G can selectively provide one of a plurality of output powers or no output power when the input power is received at the input 60. For example, in the exemplary embodiment of FIG. 3, the power supply 50 is configured such that the fifth output 62E and the sixth output 62F each can be selectively controlled to provide the 12 $V_{DC}$ output power, the 24 $V_{DC}$ output power, or no output power.

The power conversion module 52 can provide one of the plurality of output powers or no output power in response to the control signals provided by the power supply CPU 56. Over time, some peripheral components of a gaming terminal 10 may be replaced for a variety of reasons such as, for example, repair or improvement reasons. Although the replacement or new peripheral component may be similar to the component being replaced, it may require a different power to operate. Accordingly, a power supply 50 configured to provide an output power controllably selected from a plurality of output powers can provide greater flexibility and extended lifespan for a gaming terminal 10.

According to additional and/or alternative aspects, the power supply 50 can be configured such that one or more of the outputs 62A-62G provides a power for internal use within the power supply 50. For example, in the exemplary embodiment of FIG. 3, the seventh output 62G provides a 5 $V_{DC}$ output power, which can be coupled to the power supply CPU 56. It is contemplated that, according to alternative aspects, the power supply CPU 56 can additionally and/or alternatively receive power from an independent power source (not shown) such as, for example, a battery, a capacitor, and/or the like such that the power supply CPU 56 can remain powered even when no input power is received at the input 60 of the power supply 50. Advantageously, when an independent power source is provided for powering the power supply CPU 56, the power supply CPU 56 can continue to monitor and log power supply data (as described below) even when no input power is received at the input 60.

The power supply CPU 56 is configured to log electrical data, monitor power supply performance, identify power events, and/or respond to power events. To achieve these functionalities, the power supply CPU 56 can be communicatively coupled to the plurality of sensors 54A-54H. The plurality of sensors 54A-54H are each configured to detect and generate a sensor signal indicative of one or more electrical characteristics of the input power and the output powers at the input 60 and the outputs 62A-62G, respectively. In general, the electrical characteristic(s) can comprise any of a variety of electrical characteristics such as, for example, a current, a voltage, an electrical power, a frequency, a rate of change of current, a rate of change of voltage, a rate of change of electrical power, and/or a rate of change of frequency at the input 60 or one of the outputs 62A-62G. As one non-limiting example, a sensor can include a resistor coupled in series with an input (or an output) and an analog-to-digital (A/D) converter; however, it should be understood that any other suitable electrical sensor can be employed (e.g., a current sensor and/or a voltage sensor).

The sensor signals generated by the plurality of sensors 54A-54H are received and processed by the power supply CPU 56. The power supply CPU 56 can be communicatively coupled to the power supply memory 58 to store the measured electrical characteristics indicated by the sensor signals as electrical data. According to some aspects, the electrical data can be stored with an associated indication of the time and/or date (i.e., time-stamp data). For example, the power supply CPU 56 can include a real-time clock to provide the time-stamp data.

By storing the electrical data and/or time-stamp data, problems with the operation of the gaming terminal 10 can be better and more efficiently diagnosed and addressed. For example, knowing when and/or where a power anomaly occurred in the gaming terminal 10 can provide valuable information for determining the reason for an operational issue or malfunction with the gaming terminal 10. As such, the power supply CPU 56 can be configured to provide reports relating to the stored electrical data and/or time-stamp data. In one non-limiting example, a report can include (or be based on) the electrical data, an identification of the input 60 or the output 62A-62G on which the electrical data was measured, and the time and date that the electrical data was measured. In another non-limiting example, the report can further include a statistical analysis (e.g., determined by the power supply CPU 52) of electrical data measured by one or more of the plurality of sensors 54A-54H at a particular point in time and/or over a period of time. It is contemplated that the report can be provided in any suitable format such as, for example, tabular format, graphical format, a histogram, etc.

According to additional and/or alternative aspects, the stored electrical data and/or time-stamp data can be utilized to anticipate when and where problems are likely to arise in the gaming terminal 10 such that preventive services can be performed in advance. For example, the stored data can be analyzed to determine whether the performance of certain components is deteriorating over time, the rate at which certain components are functionally deteriorating, when components may need to be repaired or replaced, how operating power of the entire system or certain components changes over time (e.g., a day, week, month and/or year, etc.), and/or the input power quality. Such analyses of the electrical data and/or time-stamp data thus improve the reliability and integrity of the gaming terminal 10. Moreover, by better understanding when a component of a gaming terminal 10 is likely reaching a deteriorated state of operation, the operator can order replacement parts in advance to mitigate the amount of time the gaming terminal 10 is offline for repairs. Further, the operator could utilize this information to schedule repairs in advance so as to allow the repairs to occur during off-peak casino hours or when repair technicians are available, rather than scheduling a required repair only after the component has malfunctioned and the gaming terminal 10 is in a non-operational state. This information could also be used to facilitate or reduce the length of time necessary for general inspection and maintenance of the gaming terminal 10. Rather than require a checklist of tests to determine if components are properly responding, visibly demonstrating degradation, etc., a technician may need only view the information provided by the power supply CPU 52 on a periodic basis—resulting in further cost savings to the end user.

Logging and analyzing the electrical data and/or the time-stamp data can also facilitate an understanding of the power consumption needs of the gaming terminal 10 and/or the facility in which the gaming terminal 10 is located. In one exemplary implementation, the sensor 54H measures the current and the voltage at the input 60 and generates an input sensor signal indicative of the measured current and voltage. The power supply CPU 56 processes the input sensor signal to determine the input power of the gaming terminal 10, which can be considered the total power used by the entire gaming terminal 10 at the time of the input sensor signal.

Additionally, for example, the power supply CPU 56 can determine an average total power used by the gaming terminal 10 over a period of time based on a plurality of input sensor signals received by the power supply CPU 56 during the period of time. Based on the average total power, an average thermal energy (e.g., an average British thermal unit or BTU) produced by the gaming terminal 10 over the period of time can be determined (e.g., by the power supply CPU 56). For example, measuring the current and voltage over time, the average Wattage consumed by the gaming terminal 10 can be determined, which can be converted to a BTU value (e.g., BTU=Wattage*3.413). With an understanding of the average power consumed and/or the average heat generated by a gaming terminal 10, the operator of the facility in which the gaming terminal 10 is located can better plan for the needs and costs associated with operating the gaming terminal 10.

In an additional and/or alternative exemplary implementation, the sensors 54A-54G at the outputs 62A-62G can also measure the current and voltages at each of the outputs 62A-62G and generate respective output sensor signals indicating the measured currents and voltages. The power supply CPU 56 can determine a total output power based on the measured currents and voltages indicated by the output sensor signals. Additionally, the power supply CPU 56 can determine an average total output power over a period of time based on a plurality of output sensor signals received by the power supply CPU 56 during the period of time. Based on the total output power and the input power (or the average total output power and the average total input power), the power losses and efficiency of the power supply 50 can be determined, for example, by the power supply CPU 56.

According to additional and/or alternative aspects, the stored electrical data and/or time-stamp data can be utilized to determine whether to activate or deactivate certain outputs of the power supply 50 (e.g., the outputs 62b, 62D, 62E, 62F). For example, during times of inactivity, some of the components of the gaming terminal 10 may not need to receive power. The electrical data and/or time-stamp data can be utilized to determine when the gaming terminal 10 is not being played, how long ago the gaming terminal 10 was last played, and/or when the gaming terminal 10 is unlikely or not to be played (e.g., based on a historical analysis of the stored data). By activating and deactivating different outputs of the power supply 50 (e.g., by transmitting control signals from the power supply CPU 56 to the power conversion module 52), the overall power consumption of the gaming terminal 10 can be reduced, reducing the energy and cost required to operate the gaming terminal 10.

According to some aspects of the present disclosure, the electrical data and/or the time-stamp data can be processed by the power supply CPU 56 to determine whether one or more power events has occurred. Generally, a power event can include a variety of potential electrical conditions or events that can occur internally and/or externally to the gaming terminal 10. As non-limiting examples, the one or more power events can include brown outs, power losses, power surges, power dips, over-voltages, under-voltages, over-currents, under-currents, malfunctioning components, power supply 50 startup, power supply 50 shutdown, deteriorated performance of component, activity levels, combinations thereof, and/or the like.

The occurrence of the power event(s) can be determined, for example, based on one or more power event criteria associated with the power event(s). That is, the power event criteria can comprise data defining the circumstances under which a power event occurs. For example, the power event criteria can include one or more threshold values and/or one or more ranges of threshold values. The threshold values can include predetermined values (e.g., values determined at the time of manufacture), values automatically determined by the power supply CPU 56 based on a historical analysis of the stored electrical data from received sensor signals, and/or values defined by an administrator of the gaming terminal 10 (e.g., via an input device 38, an input/output device 42, and/or an external system 48). In some embodiments, the power event criteria also can be based on inactivity time values, time of day/day of week/day of year parameters, scheduled downtime parameters, or other operating characteristics associated with the gaming terminal 10. The power event criteria can be stored in the power supply memory 58.

In one non-limiting example, a power surge can be determined by comparing an input power detected at the input to a threshold value associated with a maximum power expected for normal operating conditions. As another non-limiting example, a power loss can be determined by comparing the input power to a threshold value associated with a minimum power expected for normal operating conditions. As a further example, a gaming terminal 10 that is not drawing an anticipated amount of current may have a light bulb that is burned out, indicating that the gaming terminal 10 needs a bulb replacement. Additionally, for example, a gaming terminal 10 that is drawing more than the anticipated amount of current may have a defective component that has failed or is about to fail.

According to additional and/or alternative aspects, the occurrence of a power event can be logged by storing power event data and/or time-stamp data in the power supply memory 58. In this way, the power events occurring for a gaming terminal 10 can be reviewed and analyzed to assess the performance, health, integrity, and functionality of the power supply 50.

It is contemplated that, according to some aspects, the electrical data, the time-stamp data, the power event data, and/or any information determined therefrom can be provided in report(s) via one or more of the output devices 40, input/output devices 42, and/or the external systems 48. As described above, the report(s) can include a statistical analysis (e.g., determined by the power supply CPU 52) of the electrical data, the time-stamp data, the power event data, and/or any information determined at a particular point in time and/or over a period of time. It is contemplated that the statistical analysis can be provided in any suitable format such as, for example, tabular format, graphical format, a histogram, etc.

According to some aspects of the present disclosure, the power supply CPU 56 can be further configured to cause a response to the power event(s) to be provided. For example, a response to a power event can include a notification to personnel of a gaming establishment that a power event occurred. In one exemplary implementation, the power supply CPU 56 can generate an alarm signal that causes an auditory and/or visual alarm provided by an output device 40 of the gaming terminal 10 (e.g., the primary display area 12, the secondary display area 14, the one or more audio speakers 16, etc.) indicating the occurrence of a power event and/or providing information relating to the power event (e.g., the type of power event). In another exemplary implementation, the power supply CPU 56 can cause an alarm signal to be transmitted to the external systems 48 (e.g., a remote server) providing information regarding the power event.

As another example, a response to a power event can include the activation and/or deactivation of one or more outputs 62A-62G of the power supply 50. In an exemplary implementation, the power supply CPU 56 can provide a control signal to the power conversion module 52 to cause the power conversion module 52 to activate and/or deactivate one or more outputs (e.g., the outputs 62B, 62D) in response to the power event being determined. A response that deactivates an output 62B, 62D of the power supply 50 can be advantageous in instances where the power event triggering the response may cause further damage to the components of the gaming terminal 10 if the power at the output 62B, 62D were not deactivated. Additionally, a response that deactivates an output 62B, 62D of the power supply 50 can be advantageous in instances where it is known that power must be removed to service a component of the gaming terminal 10 due to the occurrence of the power event.

Responses that activate and/or deactivate one or more outputs 62B, 62D of the power supply 50 also can be employed for power events that are indicative of a power consumption state of the gaming terminal 10. For example, if a power event is defined to be indicative of the wagering terminal 10 being idle, a response can be configured to deactivate one or more outputs 62B, 62D for energy conservation reasons. Additionally, for example, if a power event is defined to be indicative of the wagering game returning to an active state, a response can be configured to activate one or more outputs 62B, 62D so as to provide power to the components of the gaming terminal 10.

According to some aspects, the responses can be stored (e.g., in the power supply memory 58) as data defining a set of one or more power management policies that specify actions that take place upon the occurrence of a power event. In some embodiments, the policies may be based on inactivity time values, time of day/day of week/day of year parameters, scheduled downtime parameters, or other operating characteristics associated with a gaming terminal. That is, the responses can be based on the time-stamp data associated with the electrical data received from the sensor signals. The policies can comprise default actions, or they may be customized by an administrator (e.g., via an input device 38 and/or the external system 48). Further, the policies can be automatically learned from gaming terminal 10 usage (e.g., via the power supply CPU 56).

As described above, the components of the gaming terminal 10 can directly receive power from the outputs 62A-62G of the power supply 50 and/or indirectly receive power from the outputs 62A-62G of the power supply. Accordingly, in some instances, the power received by a component of the gaming terminal 10 may be different from the output powers provided by the outputs 62A-62G (e.g., when an output power is converted down for local use by a component of the gaming terminal 10). To obtain greater information regarding the distribution of power from the power supply 50 to the components of the gaming terminal 10, the gaming terminal 10 can optionally include one or more component sensors 66 (shown in FIG. 4) at one or more different locations external to the power supply 50. In particular, the component sensor(s) 66 can be coupled to one or more components of the gaming terminal 10 to measure electrical characteristic(s) associated with the power locally received at the component(s) of the gaming terminal 10 (e.g., a local input power received by the CPU 30 or a local input power received at the primary display 12) and/or the power locally provided (i.e., a local output providing a local output power) by the component(s) of the gaming terminal 10. The one or more component sensors 66 are also configured to generate a component-sensor signal that is indicative of the electrical characteristic(s) measured by the one or more component sensors 66, as described above for the sensors 54A-54H of the power supply 50.

Figure 4:
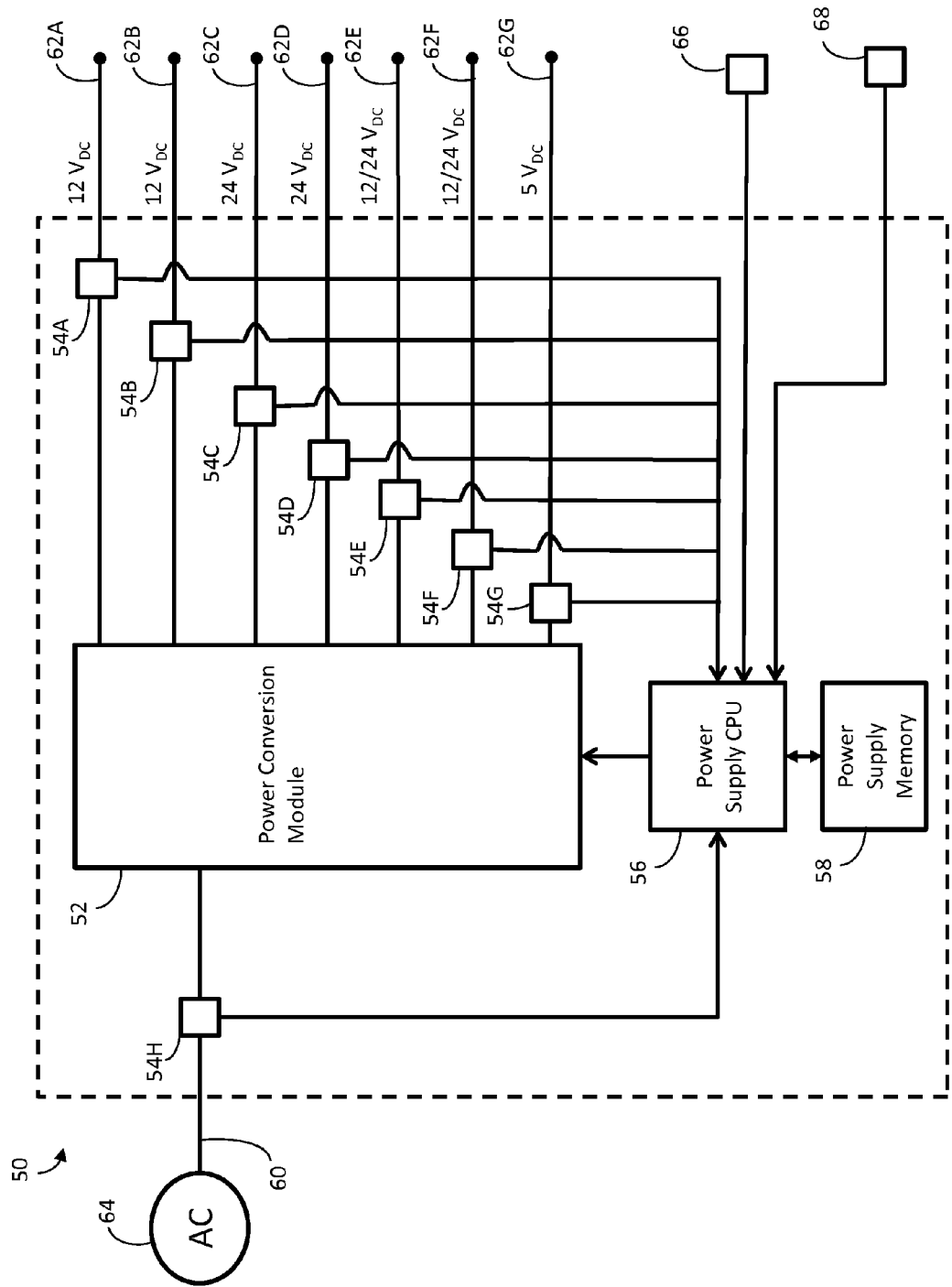
FIG. 4 is a block diagram of the exemplary power supply shown in FIG. 3 further communicatively coupled to one or more component sensors and one or more thermal sensors.

As shown in FIG. 4, the component sensor(s) 66 can be communicatively coupled to the power supply CPU 56. The power supply CPU 56 can be configured to process the component-sensor signals from the component sensor(s) 66 independently of and/or in conjunction with the sensor signals from the sensors 54A-54H of the power supply 50. Thus, utilizing the electrical data received from the sensors 54A-54H and/or the component sensors 66, the power supply CPU 56 can assess the health, performance, reliability, and integrity of the power supply 50 and/or the components of the gaming terminal 10 receiving power from the power supply 50, as described above. Based on such assessments, actions can be taken to ensure that both the power supply 50 and the other components of the gaming terminal 10 powered by the power supply 50 operate at a high performance level as operating conditions change. Some changes may be subtle and may be detected only by analyzing trends over a period of time. By monitoring the electrical data, the impact of any power quality disturbances or degradation of power supply performance can be assessed.

Optionally, the gaming terminal 10 can further include one or more thermal sensors 68 configured to measure a temperature at one or more locations of the gaming terminal 10. As one non-limiting example, a thermal sensor 68 can be provided at or adjacent to an air intake port on the gaming cabinet/housing, an air exhaust port on the gaming cabinet housing, components known to generate significant heat (e.g., the CPU 30 or the primary display 12), and/or components known to be sensitive to excessive heat. As another non-limiting example, a thermal sensor 68 can be provided at or adjacent to the power supply 50 obtain thermal data regarding the temperature of the power supply 50.

The one or more thermal sensors 68 can be further configured to generate a thermal signal indicative of the measured temperatures. As shown in FIG. 4, the thermal sensor(s) 68 can be communicatively coupled to the power supply CPU 56. The power supply CPU 56 can be configured to process the thermal signals from the thermal sensor(s) 68 independently of and/or in conjunction with the sensor signals from the sensors 54A-54H of the power supply 50 (and/or the component-sensor signals from the component sensors 66). The power supply CPU 56 can process the thermal data from the thermal signals to obtain further information regarding the health and performance of the power supply 50, individual components of the gaming terminal 10, and/or the gaming terminal 10 as a whole.

The temperature of the components of the gaming terminal 10 can provide indications as to whether the components are operating normally or whether an operational issue exists for a component of the gaming terminal 10. In some instances, the heat generated by a component of the gaming terminal 10 is a function of the power being supplied to the component or the power usage of the component. Thus, by obtaining and processing thermal data at or near various components of the gaming terminal 10, the assessment and analysis of the health, performance, integrity and reliability of the gaming terminal 10 can be enhanced. It is contemplated that the thermal data can be processed and analyzed in a similar manner to that described above with respect to the processing and analysis of the electrical data (e.g., statistical analysis at a point in time and/or over periods of time, identification of thermal events, generation of responses to thermal events, etc.).

In the exemplary embodiments described and illustrated with respect to FIGS. 3-4, the sensor signals, the component-sensor signals, and/or the thermal signals were received and processed by the power supply CPU 56; however, according to alternative aspects of the present disclosure, the CPU 30 can perform some or all of the operations described above for the power supply CPU 56. Accordingly, according to some aspects, the CPU 30 can receive the signals, process the data (i.e., the electrical data, the thermal data, and/or the time-stamp data), generate the reports, generate the control signals, generate the alarm signals, determine the power event criteria, determine the power management policies, and/or perform other functions described above. Similarly, according to alternative aspects, the main memory 32 can be utilized to store some or all of the data described above as being stored by the power supply memory 58.

According to some additional and/or alternative aspects of the present disclosure, the external system 48 can perform some or all of the operations described above for the power supply CPU 56 and/or the power supply memory 58. As such, the external system 48 can receive the signals, process the data (i.e., the electrical data, the thermal data, and/or the time-stamp data), store the electrical data and/or the thermal data, generate the reports, generate the control signals, generate the alarm signals, determine the power event criteria, determine the power management policies, and/or perform other functions described above. It is contemplated that, according to some aspects, security levels and protocols can be utilized in the communications between the external system 48 and the power supply 50 to protect the configuration settings of the power supply 50 and, thus, prevent inadvertent alteration.

The power supply CPU 56 may include any suitable processor(s), such as, for example, a plurality of microprocessors including a master processor, a slave processor, and a secondary or parallel processor. The power supply CPU 56, as used herein, can comprise any combination of hardware, software, or firmware disposed in or outside of the gaming terminal 10 that is configured to communicate with or control the transfer of data between the gaming terminal 10 and a bus, another computer, processor, device, service, or network. The power supply CPU 56 can comprise one or more controllers or processors and such one or more controllers or processors need not be disposed proximal to one another and may be located in different devices or in different locations. It is contemplated that, according to some aspects, the power supply CPU 56 and/or the power supply memory 58 may not be located within a common housing. According to alternative aspects, the power supply CPU 56 and/or the power supply memory 58 can be located in a common housing with the power conversion module 52. In one non-limiting embodiment, the housing can further include a communications port for communicatively coupling the power supply 50 to the I/O bus 36, the CPU 30, and/or the external system 48 (e.g., a port configured according to an USB, I2C, RS-232, RS-485, or other standard). In another non-limiting embodiment, the power supply 50 can be communicatively coupled to the I/O bus 36, the CPU 30, and/or the external system 48 via a wireless communications protocol (e.g., Bluetooth, etc.).

Additionally, while the sensors 54A-54H are described for purposes of FIG. 3 as being included in the power supply 50, it should be understood that the sensors can be integral with and/or distinctly separate from the power supply 50. It should also be understood that, while each output 62A-62G is coupled to a sensor 54A-54G in the exemplary embodiments illustrated in FIGS. 3-4, one or more of the inputs 60 and/or one or more of the outputs may not be coupled to a sensor 54A-54G according to alternative aspects of the present disclosure.

As described above, power supply 50 can include a plurality of outputs 62A-62G. It is contemplated that, according to some aspects of the present disclosure, the outputs 62A-62G can be initially activated and/or deactivated in response to a startup, shutdown, and/or restart operation according to a predetermined sequence. For example, the output 62G can be activated prior to the outputs 62A-62F. In some instances, the activation and/or deactivation of some outputs 62A-62G may be delayed by a predetermined period of time from the activation of other outputs 62A-62G so as to allow the initial outputs 62A-62G to stabilize before activating and/or deactivating additional outputs 62A-62G. According to some aspects, the sequence and timing for activating and/or deactivating the outputs 62A-62G can be determined according to instructions provided by the power supply CPU 56, the CPU 30, and/or the external system 48. Thus, the power output sequencing of the power supply 50 can be controllably configured and/or modified as conditions change for the gaming terminal 10.

Figure 5:
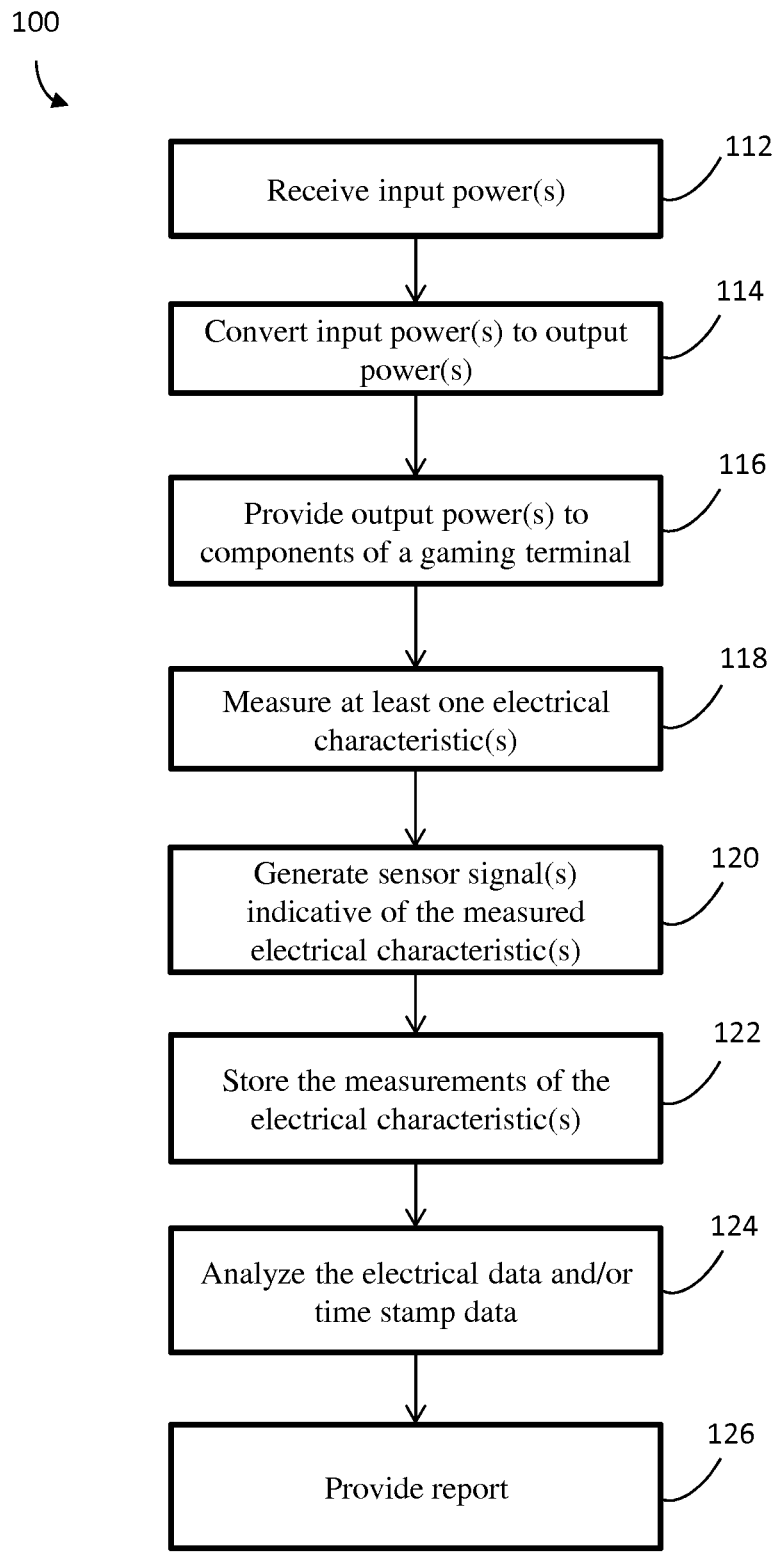
FIG. 5 is a flowchart for an algorithm that corresponds to instructions executed by a controller in accord with at least some aspects of the disclosed concepts.

Referring now to FIG. 5, a flow diagram is illustrated for a process 100 for monitoring a power supply, according to some exemplary aspects of the present disclosure.

At block 112, one or more input powers are received at one or more inputs 60 of a power supply 50 from an electrical power source 64 (e.g., an AC power source and/or a DC power source). At block 114, the one or more input powers are converted to one or more output powers. At block 116, the one or more output powers are provided, via one or more outputs 62A-62G of the power supply 50, to one or more components of the gaming terminal 10. At block 118, at least one electrical characteristic of the one or more input powers and the one or more output powers is measured using one or more sensors 54A-54H. The electrical characteristic(s) can include, for example, a current, a voltage, an electrical power, a rate of change of current, a rate of change of voltage, a rate of change of electrical power, combinations thereof, and/or the like. At block 120, the sensor signal(s) are generated by the one or more sensors 54A-54H. At block 122, the measurements of the electrical characteristic(s) are stored in a memory (e.g., the memory 32, the power supply memory 58, and/or the external system 48) as electrical data and, optionally, with associated time-stamp data.

At block 124, the electrical data and/or the time-stamp data is analyzed (e.g., via the CPU 30, the power supply CPU 56, and/or the external system 48) to assess the health, performance, reliability, and/or integrity of the power supply 50. At block 126, a report based on the analysis of the electrical data is provided (e.g., via at least one of the output devices 40, the input/output devices 42, and the external system 48).

Figure 6:
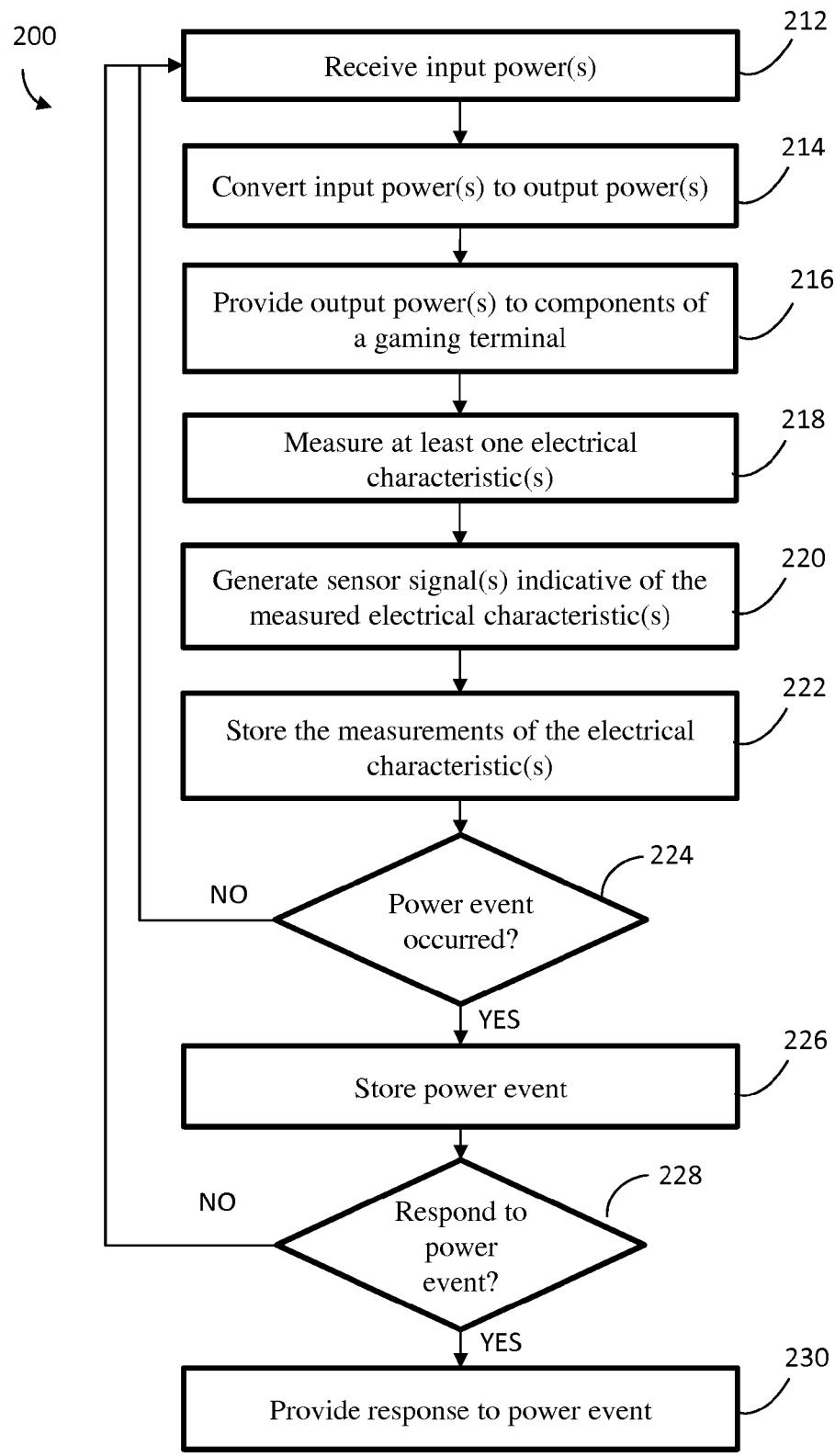
FIG. 6 is a flowchart for an algorithm that corresponds to instructions executed by a controller in accord with at least some additional aspects of the disclosed concepts.

FIG. 6 illustrates another flow diagram for a process 200 for monitoring a power supply, according to additional and/or alternative aspects of the present disclosure.

At block 212, one or more input powers are received at one or more inputs 60 of a power supply 50 from an electrical power source 64 (e.g., an AC power source and/or a DC power source). At block 214, the one or more input powers are converted to one or more output powers. At block 216, the one or more output powers are provided, via one or more outputs 62A-62G of the power supply 50, to one or more components of the gaming terminal 10. At block 218, at least one electrical characteristic of the one or more input powers and the one or more output powers is measured using one or more sensors 54A-54H. At block 220, the sensor signal(s) are generated by the one or more sensors 54A-54H. At block 222, the measurements of the electrical characteristic(s) are stored (e.g., in the memory 32, the power supply memory 58, and/or the external system 48) as electrical data and, optionally, with associated time-stamp data.

At block 224, the electrical data and/or time-stamp data is analyzed (e.g., via the CPU 30, the power supply CPU 56, and/or the external system 48) based on one or more power event criteria (e.g., stored in the memory 32, the CPU memory 58, and/or the external system 48) to determine whether a power event has occurred. If it is determined that a power event has not occurred at block 224, the process 200 returns to block 212. If it is determined that a power event has occurred at block 224, then the power event and, optionally, the associated time-stamp data are stored (e.g., the memory 32, the power supply memory 58, and/or the external system 48) to log the power event at block 226. At block 228, it is determined whether to generate a response to the power event, for example, based on one or more power management policies stored in the memory 32, the power supply memory 58, and/or the external system 48. If no response is to be generated based on the determination at block 228, the process 200 returns to block 212. Otherwise, the process 200 proceeds to block 230 at which a response (which may be determined from a plurality of responses based on the power management policies at block 228) is provided via an output device 40, an input/output device 42, and/or the external system 48.

FIGS. 5-6, described by way of example above, represents one algorithm that corresponds to at least some instructions executed by the CPU 30, the power supply CPU 50, and/or the external system 48 to perform the above described functions associated with the disclosed concepts. It is also within the scope and spirit of the present concepts to omit steps, include additional steps, and/or modify the order of steps presented above. As one non-limiting example, the processes 100, 200 can further include steps for measuring electrical characteristic(s) using one or more component sensors 66, analyzing the component-sensor signals, measuring thermal characteristic(s) using one or more thermal sensors 68, and/or analyzing the thermal signals. Additionally, for example, the processes 100, 200 can include steps for determining whether a power event occurred further based on the thermal signals and/or the component-sensor signals.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming terminal, comprising:
one or more input devices configured to receive a wager from a player of the gaming terminal;
one or more display devices configured to display a wagering game; and
a power supply configured to power the one or more input devices and the one or more display devices, the power supply including:
an input receiving an input power from an electrical power source,
a plurality of outputs providing a plurality of output powers, wherein at least one of the output powers has an output voltage different from an output voltage of others of the output powers,
a power conversion module coupled to the input and the plurality of outputs, the power conversion module being configured to convert the input power received at the input to the plurality of output powers provided at the plurality of outputs,
a plurality of sensors, wherein a first of the sensors is communicatively coupled to the input and configured to measure an electrical characteristic of the input power and to generate a sensor signal indicative of the measured electrical characteristic of the input power, and wherein each of second ones of the sensors is communicatively coupled to a respective one of the plurality of outputs and configured to measure an electrical characteristic of a respective one of the output powers and to generate a respective sensor signal indicative of the measured electrical characteristic of the respective one of the output powers,
one or more processors communicatively coupled to the sensors, the one or more processors being configured to determine log data based on the sensor signals, the log data including an indication of each measured electrical characteristic indicated by the sensor signals, and
a memory communicatively coupled to the one or more processors, the memory being configured to store the log data, the power conversion module being configured such that at least one of the plurality of outputs can be selectively activated and deactivated in response to a control signal generated by at least one of the one or more processors based on the stored log data.

2. The gaming terminal of claim 1, wherein the log data further includes an indication of a time and a date associated with each of the measured electrical characteristics.

3. The gaming terminal of claim 1, wherein at least one of the one or more processors is configured to determine the occurrence of a power event based on the log data determined by the one or more processors and one or more power event criteria stored in the memory.

4. The gaming terminal of claim 3, wherein the power event includes at least one of an abnormal input power, a power surge, a power dip, an over-voltage, or an over-current.

5. The gaming terminal of claim 3, further comprising an external system communicatively coupled to at least one of the one or more processors, the one or more power event criteria being based on a signal received via the external system.

6. The gaming terminal of claim 3, wherein the one or more power event criteria is automatically determined by at least one of the one or more processors based on the log data stored in the memory.

7. The gaming terminal of claim 3, wherein at least one of the one or more processors are further configured to cause at least one of an audio notification or a video notification of the power event to be provided in response to the power event.

8. The gaming terminal of claim 1, wherein each of the electrical characteristics of the input power and the output powers comprises at least one of a voltage or a current.

9. The gaming terminal of claim 1, wherein at least one of the one or more processors is further configured to generate a control signal, the power conversion module being further configured to change the voltage provided by at least one of the plurality of outputs in response to the control signal.

10. A method of monitoring a power supply of a gaming terminal, comprising:
receiving, at an input of the power supply of the gaming terminal, an input power from an electrical power source;
converting the input power to a plurality of output powers;
providing, at a plurality of outputs of the power supply, the plurality of output powers to components of the gaming terminal, wherein at least one of the output powers has an output voltage different from an output voltage of others of the output powers;
measuring, via an input power sensor communicatively coupled to the input, an electrical characteristic of the input power and generating an input power sensor signal indicative of the measured electrical characteristic of the input power;
measuring, via a plurality of output power sensors each communicatively coupled to respective ones of the outputs, an electrical characteristic of a respective one of the output powers and generating a respective output power sensor signal indicative of the measured electrical characteristic of the respective one of the output powers; and
determining, by one or more processors, log data based on the sensor signals, the log data including an indication of each measured electrical characteristic indicated by the sensor signals;
storing, in a memory coupled to the one or more processors, the log data; and
selectively activating or deactivating at least one of the plurality of outputs in response to a control signal generated by at least one of the one or more processors based on the stored log data.

11. The method of claim 10, further comprising:
analyzing the stored log data; and
providing a report based on the analysis of the stored log data.

12. The method of claim 10, further comprising, for each measurement of the electrical characteristic of the input power or any of the output powers, storing an associated time and a date in the memory.

13. The method of claim 10, further comprising determining the efficiency of the power supply by comparing the measured electrical characteristic of the input power to the sum of the measured electrical characteristic for each of the output powers.

14. The method of claim 10, further comprising determining whether a power event has occurred based on the measurements of the respective electrical characteristic for the input power and the output powers.

15. The method of claim 14, further comprising providing a response to a power event based on one or more power event policies stored in the memory.

16. The method of claim 15, wherein the response comprises deactivating at least one of the one or more outputs such that no output power is provided at at least one of the outputs.

17. A gaming terminal, comprising:
one or more input devices configured to receive player-inputs for playing a game;
one or more display devices configured to display the game;
a power supply including an input and a plurality of outputs providing a plurality of output powers, the power supply being configured to convert an input power received from an electrical power source at the input to a plurality of output powers provided at the plurality of outputs, at least one of the output powers having an output voltage different from an output voltage of others of the output powers;
a plurality of sensors, wherein a first of the sensors is communicatively coupled to the input and configured to measure an electrical characteristic of the input power and to generate a sensor signal indicative of the measured electrical characteristic of the input power, and wherein each of second ones of the sensors is communicatively coupled to a respective one of the plurality of outputs and configured to measure an electrical characteristic of a respective one of the output powers and to generate a respective sensor signal indicative of the measured electrical characteristic of the respective one of the output powers;
one or more processors communicatively coupled to the plurality of sensors, the one or more processors being configured to process the sensor signals received from the plurality of sensors; and
a memory communicatively coupled to the one or more processors, the memory being configured to store data based on the measured electrical characteristic indicated by the sensor signals, the data including an indication of the measured electrical characteristic and a time for each of the sensor signals generated by the plurality of sensors, the data being received from the one or more processors, at least one of the one or more processors being configured to analyze the data stored in the memory and generate a report based on the analysis, at least one of the one or more processors being configured to determine the occurrence of a power event based on the data and one or more power event criteria stored in the memory, the power supply being configured such that at least one of the plurality of outputs can be selectively activated and deactivated in response to a control signal generated by at least one of the one or more processors based on the stored data.

18. The gaming terminal of claim 17, wherein at least one of the one or more processors is further configured to conduct the game.

* * * * *